United States Patent [19]

Monsen

[11] 4,112,370
[45] Sep. 5, 1978

[54] DIGITAL COMMUNICATIONS RECEIVER FOR DUAL INPUT SIGNAL

[75] Inventor: Peter Monsen, Stow, Mass.

[73] Assignee: Signatron, Inc., Lexington, Mass.

[21] Appl. No.: 712,147

[22] Filed: Aug. 6, 1976

[51] Int. Cl.² .................................................. H04B 1/12
[52] U.S. Cl. ........................................ 325/40; 325/42;
325/65; 325/304; 325/324; 343/100 PE
[58] Field of Search ............... 325/39, 40, 41, 42,
325/56, 65, 304, 321, 324; 333/18; 343/100 PE,
100 CS

[56] References Cited

U.S. PATENT DOCUMENTS

| 3,500,207 | 3/1970 | Ruthroff | 325/60 |
|---|---|---|---|
| 3,633,107 | 1/1972 | Brady | 325/42 |
| 3,727,136 | 4/1973 | Schroeder | 325/324 |
| 3,735,266 | 5/1973 | Amitay | 343/100 PE |
| 3,875,515 | 4/1975 | Stuart | 325/42 |
| 3,879,664 | 4/1975 | Monsen | 325/303 |
| 3,883,872 | 5/1975 | Fletcher | 343/100 PE |
| 3,914,691 | 10/1975 | Meadors | 325/324 |
| 3,943,448 | 3/1976 | Motley | 325/321 |
| 3,974,449 | 8/1976 | Falconer | 325/321 |
| 3,986,123 | 10/1976 | Tirró | 343/200 |

Primary Examiner—Robert L. Griffin
Assistant Examiner—Michael A. Masinick
Attorney, Agent, or Firm—Robert F. O'Connell

[57] ABSTRACT

A dual channel receiver system for receiving polarized signals, which system reduces cross-interference between the signal channels by utilizing adaptive filter equalization means responsive to the input received signals and to error control signals for providing a plurality of weighting signals which are used to combine selectively with the input received signals to reduce the errors, including particularly cross-polarization and noise errors therein. The channels each include decision-directed error signal generating means for providing such error control signals. The system also includes means for preventing system failures wherein both received signals fade simultaneously under which conditions data reversal in the channels could occur and wherein one received signal fades under which condition the same data is produced in both channels.

13 Claims, 7 Drawing Figures

DIGITAL COMMUNICATIONS RECEIVER FOR DUAL INPUT SIGNAL

INTRODUCTION

This invention relates generally to a communications receiver and, more particularly, to high speed digital communication receivers having dual, independent input signal channels and including means for reducing cross-interference between such signal channels.

BACKGROUND OF THE INVENTION

In communication systems which accept dual input signals, cross-interference between such signals is often high and suitable reception thereof tends to deteriorate because of the interference problem. A typical system may be, for example, a microwave line-of-sight communications link, the capacity of which is doubled by transmitting independent data streams which are orthogonally polarized. Under normal circumstances cross-polarization effects, i.e. the effects of interference between such orthogonally polarized signals, are sufficiently low to result in overall good performance. However, when poor propagation conditions exist, such as during heavy rain, or when air turbulence is present, or when the signals travel through a multipath communication medium, the cross-polarization effects tend to increase and the two signals are not easily isolated merely on the basis of polarization.

Accordingly, appropriate signal processing techniques must be utilized to cancel the cross-polarization effects that arise in the dual signal channel and, thereby, to reduce the interference between them to an acceptable level. For example, under typical normal conditions, cross-polarization levels may be as low as 40 db below the principal signal components. However, in the presence of a relatively heavy rainstorm the principal signal components may fade considerably while the cross-polarized signal components may be increased in strength by a relatively large amount so that the latter components are less than 10 db below the principal signal components and the interference becomes intolerable.

While it is possible under such conditions to turn off one of the transmitter channels, thereby removing the source of the cross-polarization interference, such a solution is not desirable since it reduces the signal carrying capacity of the system in half.

Another proposed system for dealing with cross-polarization effects is described in U.S. Pat. No. 3,500,207 issued on Mar. 10, 1970, to Clyde I. Ruthroff. The Ruthroff system merely corrects for a polarization alignment by transmitting a pilot signal in one of the cross-polarizations which is then detected as an error signal in the other polarization at the receiver and fed back to a polarization rotator system which rotates the entire received signal in order to minimize the error. Such a system merely rotates both of the received signal components simultaneously to an appropriate orientation which tends to produce the least cross-polarization effect, both components, however, remaining substantially orthogonal with respect to each other. However, should the orthogonality change as a result of the transmission, as is likely to happen under poor propagation conditions, the mere rotation of such components will not provide the optimum elimination of cross-polarization effects which may have occurred in the transmission medium.

Another approach is discussed in U.S. Pat. No. 3,735,266 issued on May 22, 1973, to N. Amitay. In Amitay's system, a pilot signal is transmitted with each of the cross-polarized channels and means are included in the receiver for detecting components of the pilot signal from each channel to indicate the level of cross-polarization which occurs. The components of such pilot signals are then appropriately processed to generate control signals, proportional to the degree of correction required, to cancel the cross-polarization component in each of the channels. Cancellation is achieved by control circuits, either in the RF or the IF sections of the receiver, in which the received signals are directly operated upon by the control signals to cancel the cross-polarization components therein.

The Amitay system does not consider the cross-polarization effects over the entire bandwidth of the signal but rather only considers the effect which occurs substantially at or near the center frequency of the frequency band which is being transmitted, i.e. at the region where the pilot signal is present. Moreover, such a system requires the pilot signal to be carried along with the information signal and not only necessitates the use of extra equipment both at the transmitter and the receiver, but also reduces the amount of information that can be carried by the system. Further, the receiver system of Amitay is not decision-directed, i.e. the cross-polarization correction is not self-contained in the receiver system but requires not only the generation of a pilot signal at the transmitter system to be carried along with the information signal but also further requires correction calculations which are based on a pre-conceived, or predicted, transmission channel model and on the assumption that all components of the system are ideal components having no inherent error generating characteristics. Such a system can be contrasted with decision-directed systems which not only avoid the need for a pilot signal but also minimize system errors no matter where they occur. Thus, the decision-directed system considers transmission effects, no matter what the transmission characteristics are (they need not be known or predicted ahead of time) and also considers the effects of using non-ideal, or imperfect, components in the system.

Decision-directed systems have been suggested for use, for example, in diversity communication systems, such as described in U.S. Pat. No. 3,879,664, issued on Apr. 22, 1975, to Peter Monsen, and U.S. Pat. No. 3,633,107, issued on Jan. 4, 1972, to D. M. Brady. In such systems the same signal is received at different diversity channel input receivers and a decision-directed generation of an error signal is appropriately determined and applied to filter equalizer circuitry within each channel to minimize the errors which arise during transmission through a dispersive transmission medium. Such systems do not, however, involve the problem of cross-polarization as would occur in a dual channel system wherein two transmitters transmit signals which are polarized with respect to each other (usually orthogonally polarized) and two receivers are used to receive the two polarized signals. The latter case, in which the problem of interference between the cross-polarized signals arises, requires solutions not previously suggested in any of the above-discussed patents. It is desirable that a suitable decision-directed control system for minimizing errors be devised so that a maximum amount of information can be transmitted by a polarized transmission system without the need for carrying reference signals along with the information signals. The present invention adapts principles related to the use of filter equalization techniques to the cross-polarization problem to provide an effective solution thereto.

BRIEF SUMMARY OF THE INVENTION

In accordance with the invention, an adaptive decision-director error minimization control system at the receiver of a polarized communications system is utilized to minimize the cross-polarization error components which arise in the polarized channels during the transmission of the original signals through a transmission medium. Such a system utilizes adaptive filter equalizers in each of the dual channel paths, the weights of the equalizers being determined by a decision-directed error signal which is appropriately generated to produce a minimum mean-square-error environment. Further, provision is made to prevent the operation of the overall system in stable, but undesired, modes of operation wherein, for example, the polarized signals are interchanged between the two channels so that incorrectly polarized signals are provided at the outputs of each channel, or wherein the signal from only one channel is provided at the outputs of both receiver channels and the associated polarized signal is lost.

The use of an adaptive equalization system in accordance with the invention avoids the requirements for transmitting a pilot reference signal along with the information signals. Moreover, the equalizer as utilized in the invention treats the entire frequency band over which the information is carried in setting the weights for the adaptive filter equalizers. Moreover, the effects of noise and component imperfections are also minimized, as well as the cross-polarization effects, in the operation of the adaptive equalization system of the invention, since the overall system is designed to minimize mean-square-error wherever such error occurs. In addition, the adaptive equalizer system of the invention provides for automatic gain control, as well as for cross-polarization minimizations.

DESCRIPTION OF THE INVENTION

A more detailed description of the invention and the implementation thereof is described with reference to the drawings wherein.

Figure 1:
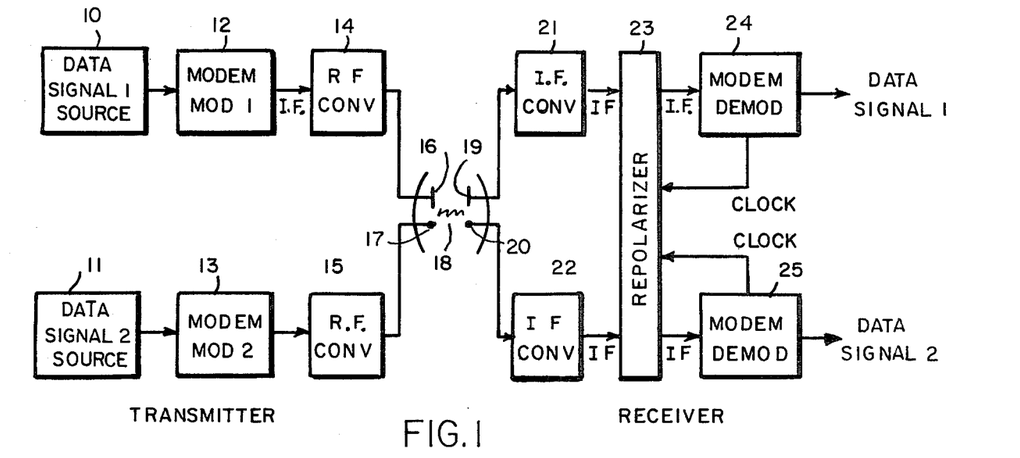
FIG. 1 shows a block diagram of an overall dual channel transmitter/receiver system of the invention.

As can be seen in FIG. 1, the overall system configuration in its broadest aspect includes a pair of data signal sources 10 and 11, each of which is appropriately modulated by a modem modulator 12 and 13, respectively, the modulated signals being fed to RF conversion circuitry 14 and 15, respectively, the RF outputs of which are supplied to a pair of cross-polarized antennas 16 and 17, respectively. In a typical polarized system of the type discussed herein the antennas may be orthogonally polarized, as shown in FIG. 1, although the overall system is not necessarily intended to be limited only to orthogonal polarizations. The dual signals which are appropriately polarized relative to each other are transmitted through a transmission medium 18 to corresponding polarized antennas 19 and 20 at a receiver system.

The signals received at receiver antennas 19 and 20 are supplied to IF conversion circuitry 21 and 22, respectively, for producing IF signals therefrom. Each of the IF signals may have included therein both the principal component of the desired polarization, as well as a cross-polarized error component representing a portion of the other signal which has been transmitted in association therewith. Such cross polarization error component, or cross-talk signal, arises during the transmission of the principal signals through medium 18. Since the presence in one signal of the cross-polarized error component of the other signal is undesirable, it is necessary to eliminate, or reduce as effectively as possible, the presence thereof before supplying the data at the output of the receiver to an appropriate utilization system, i.e. to a system in which the data is to be used. Such elimination is performed in what is identified in FIG. 1 as re-polarized circuitry 23, which supplies repolarized IF signals in each channel which are then appropriately demodulated by modem demodulators 24 and 25, respectively, to provide the output data signals as desired.

In accordance with the system of the invention as broadly shown in FIG. 1, re-polarizer circuitry 23 in effect represents a self-contained adaptive unit which minimizes the error component in each channel which is due to the presence of a cross-polarization component from the other associated channel, as well as errors which may be due to the effects of noise and of component imperfections, or any other effects which lead to system degradation.

Figure 2:
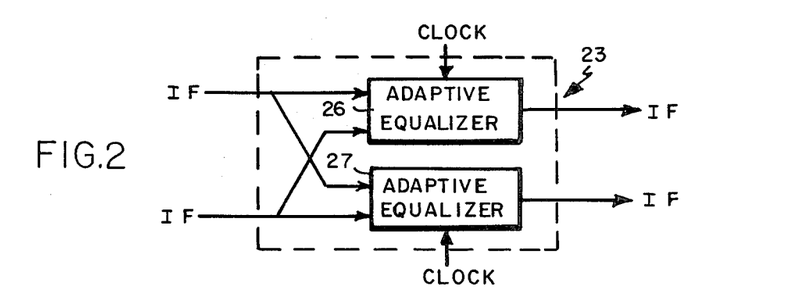
FIG. 2 shows a block diagram of a portion of the receiver system of FIG. 1.

The data input signals are high bit rate digital data signals, a typical system operating, for example, at 12.6 megabits per second. The re-polarizer comprises, in effect, two adaptive equalizers 26 and 27, as shown in FIG. 2. Adaptive equalizer 26 associated with a first channel extracts the desired signal from the combination of the principal input signal to such channel as a cross-polarized component from the other channel, as well as any noise which may also be thereon, while the adaptive equalizer 27 performs a similar function with respect to its principal input signal and the associated cross-polarization component. Appropriate timing from a suitable clock input which is normally readily available in any polarized modern receiver system provides not only an output clock signal for the date output signal, but also a clock signal which is available for use in the adaptive equalizers. A single initial alignment of the clock phase is required for a proper operation of the re-polarizer system. In systems where specific modem clocks are not available, the re-polarizer can incorporate suitable time tracking circuitry to provide this function, as discussed below.

Figure 3:
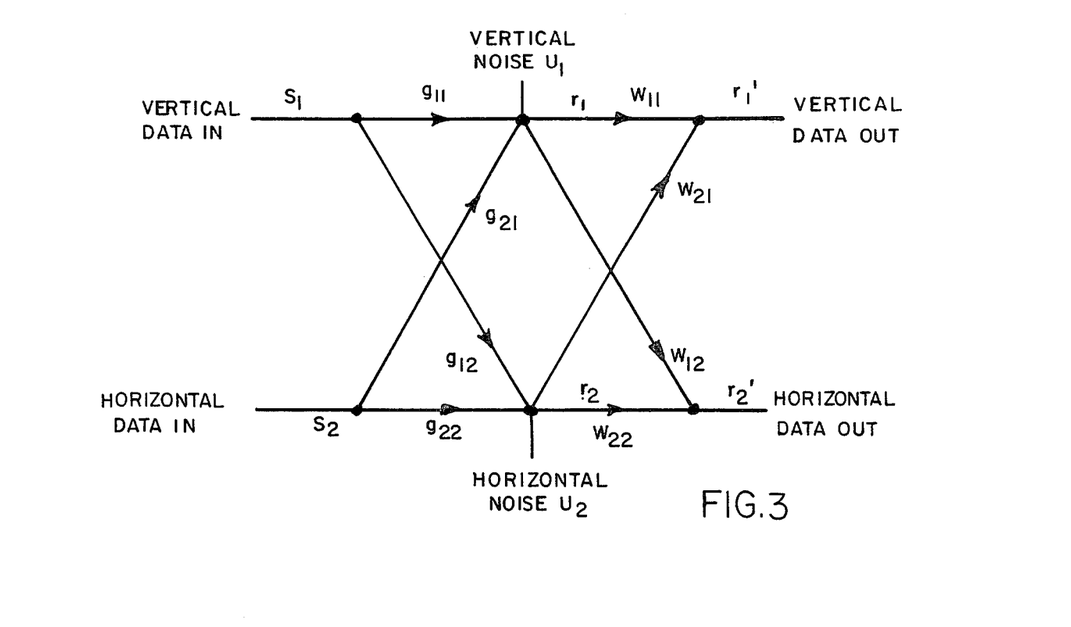
FIG. 3 shows a signal flow diagram of the signals present in the receiver system of FIG. 1.

FIG. 3 shows, in effect, a signal flow diagram of the overall system in which two input data channels, for example, operate to provide orthogonally polarized signals. For purposes of example, the upper channel FIG. 3 is depicted as providing vertically polarized data, while the lower channel provides horizontally polarized data. Other orthogonally polarized signals can be provided, such as left-circular polarized and right-circular polarized signals, the structure and principles of operation of the invention applying equally as well thereto. If the orthogonally polarized data signals are depicted as $S_1$ and $S_2$, the received signals denoted as $r_1$ and $r_2$ contain both a desired component and an undesired cross-polarization component from the other associated channel, as well as noise components, $u_1$ and $u_2$. The received signals can be mathematically represented by the following expressions:

$$r_1 = g_{11}S_1 + g_{21}S_2 + u_1$$

$$r_2 = g_{12}S_1 + g_{22}S_2 + u_2 .$$

The coefficients $g_{11}$, $g_{12}$, $g_{21}$ and $g_{22}$ are identifiable as the polarization and cross-polarization coefficients and, in general, are complex numbers representing both amplitude and phase relationships with which the signals are being added. Generally speaking such components vary slowly with time as compared to the high data rate (e.g., 12.6 megabits/second).

A general approach to the re-polarization technique is to provide appropriate weighting factors for each of the received signal components such that the weighted signals when combined cancel the cross polarization components as effectively as possible. Thus, with respect to the vertical channel the receiver signal $r_1$ contains a component $g_{21}S_2$ which is cancelled by a weighted signal which represents a weighting of receiver signal $r_2$ by weighting factor $w_{21}$. The relative weighting of $r_2$ by weighting factor $w_{21}$ together with an appropriate weighting of the main channel signal $r_1$ by a weighting factor $w_{11}$ assures the most effective minimization of the cross-polarized component and the noise components $u_1$ and $u_2$ so that the vertical data output following the detection, or demodulation, thereof by modem demodulator 24 will assure the best reproduction of the input data signal. Similarly, the weighting factors $w_{22}$ and $w_{12}$ assure the most effective minimization of the cross-polarized component in the horizontal channel as well as the noise components $u_1$ and $u_2$ to produce a horizontal data output signal which corresponds as best as possible to the horizontal input data.

Figure 4:
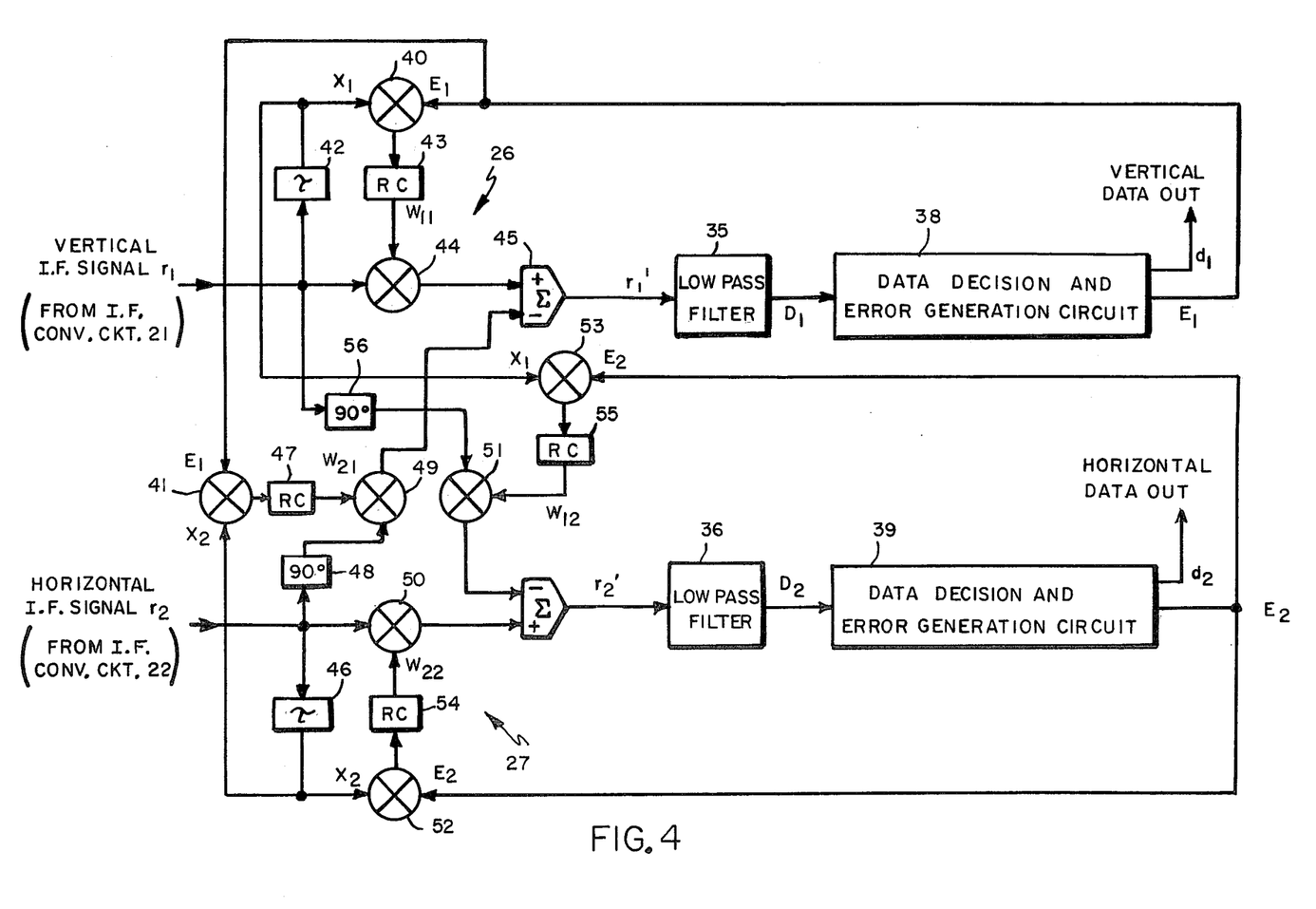
FIG. 4 shows a more detailed block diagram of the adaptive equalization means of the receiver system of FIG. 1.

A specific implementation of a weighting system for providing such reduction in error due to cross-polarization components as well as to noise components is shown in FIG. 4. Although the adaptive equalization process can be carried out either at IF or at baseband, the system shown in FIG. 4 is specifically shown for IF equalization, preceding demodulation of the input receiver signals. If the adaptive equalization is performed at baseband, the input signals thereof are demodulated prior to equalization.

As seen in FIG. 4, the vertically polarized signal $r_1$ and the horizontally polarized signal $r_2$, each at IF frequencies, are each received from their appropriate IF conversion circuits 21 and 22, respectively. The input signals are supplied to suitable adaptive equalizer weighting circuitry 26 and 27 described in more detail below, to produce weighted output signals $r'_1$ and $r'_2$ to appropriate low pass filters 35 and 36 which provide digital data output signals $D_1$ and $D_2$.

Error generating systems 38 and 39 associated with each of the signal channels produce error signals $E_1$ and $E_2$, respectively, which are fed back to adaptive equalizers 26 and 27, respectively, for controlling the weighting signals $w_{11}$, $w_{21}$, $w_{22}$ and $w_{12}$, as described in more detail below.

Figure 5:
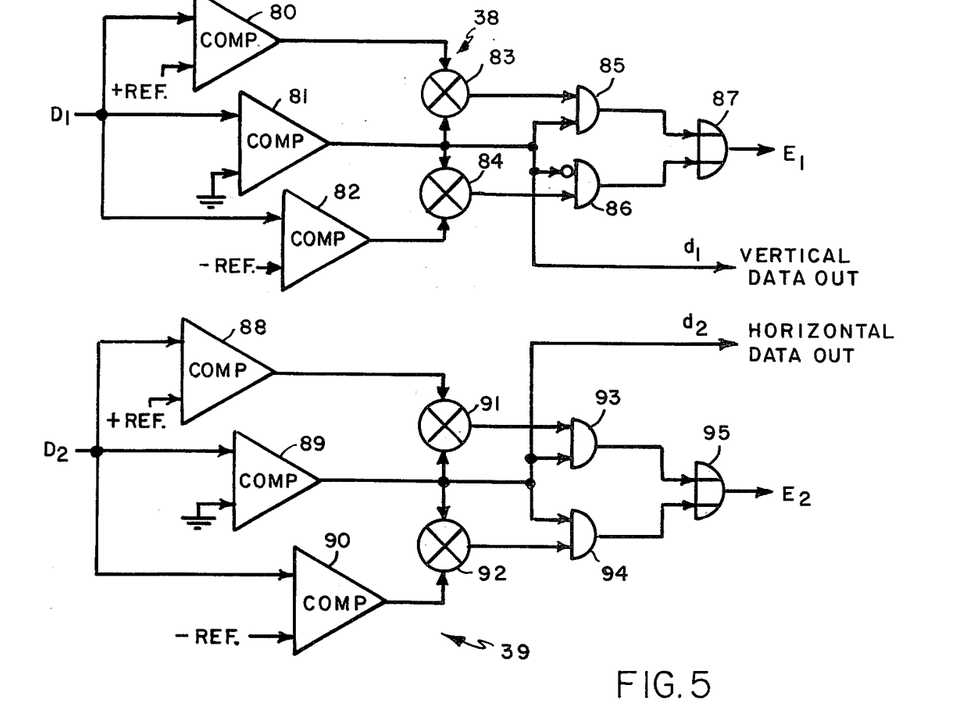
FIG. 5 shows a more detailed block diagram of the data decision and error generation circuit of FIG. 4.

The data decision and error-generation circuitry 38 and 39 of FIG. 4 are shown in more detail in FIG. 5. The input signal $D_1$ is supplied to comparator circuits 80, 81 and 82 and the input signal $D_1$ is supplied to similar comparator circuits 88, 89 and 90. In each case the comparators compare the input with positive (+1) and negative (−1) reference levels (+REF and −REF at comparators 80 and 82 and comparators 88 and 90, respectively) and with a ground (0) level (at comparators 81 and 89, respectively).

The outputs of comparators 80 and 81 are multiplied at multiplier 83 and supplied to one input of AND gate 85, the other input thereto being the output of comparator 81. The outputs of comparators 81 and 82 are also multiplied at multiplier 84 and supplied to one input of AND gate 86, the other input thereof also being supplied with the output of comparator 81 changed in sign. The output from AND gates 85 and 86 are supplied to an OR gate 87, which thereupon provides the error signal $E_1$. The output of comparator 81 is $d_1$, the desired vertical data out.

In a similar manner, the circuitry 39 produces the error signal $E_2$ with reference to the input $D_2$, comparators 88–90 operating in combination with multipliers 91 and 92, AND gates 93 and 94, and OR gate 95, as shown in FIG. 5. The output of comparator 89 is $d_2$, the desired horizontal data out. The signals $D_1$ and $D_2$ and the error signals $E_1$ and $E_2$ are in general complex signals having both real and imaginary components, the required circuit elements being designed, as would be understood by those in the art, to handle such complex signals.

As shown in FIG. 4, signals $E_1$ and $E_2$ are utilized to control the weighting functions, which are in turn used to weight the input signals $r_1$ and $r_2$ in order to minimize the errors due to noise components or other error sources, as well as to the cross-polarization error components. Thus, signal $E_1$ is supplied to modulators 40 and 41 where they are combined, respectively, with the input vertical IF signal $r_1$ which has been delayed by a suitable time delay $\tau$ via time delay network 42 (the latter signal being designated as $x_1$) and with the input horizontal IF signal $r_2$ also delayed by $\tau$ and designated as $x_2$. The output of modulator 40 is supplied through a suitable RC filter circuit 43 to produce a weighting signal identified in FIG. 4 as $w_{11}$. Such weighting signal is supplied to modulator 44 where it is combined with the undelayed input signal $r_1$, the output of modulator 44 thereupon being supplied to one input of a summing circuit 45.

The output of modulator 41 is supplied to an RC filter circuit 47 to form weighting function $w_{22}$, the latter weighting function being used to weight the horizontal IF signal $r_2$ (appropriately shifted by 90° by phase shifting circuitry 48) at the modulator 49 to produce a cancellation signal at the output thereof which is supplied to summing circuit 45 to cancel the cross-polarization component of the horizontal signal $r_2$ which may be contained in the vertical signal $r_1$. The weighted output signal $r'_1$ is thereupon formed as the vertical output data signal, as seen in FIG. 4.

In a similar manner $r'_2$ is formed by combining a signal which weights the horizontal IF signal $r_2$ with an appropriate weighting function $w_{22}$ at the modulator 50 and a cross-polarized cancellation signal which is in effect a weighted vertical IF signal $r_1$, weighted by an appropriate weighting function $w_{12}$ at modulator 51. The weighted signals are appropriately formed in a corresponding manner to those formed with respect to the vertical channel discussed above by utilizing the error signal $E_2$, modulators 52 and 53, and RC circuits 54 and 55.

Thus, in accordance with FIG. 4, the cross-polarization component in the vertical channel (represented in FIG. 3 as $g_{21}S_2$) is effectively cancelled by a weighted cross-polarized signal (represented in FIG. 3 by $w_{21}r_2$). In a similar manner, the cross-polarization component in the horizontal channel (represented in FIG. 3 by $g_{12}S_1$) is cancelled by a weighted cross-polarized signal (represented in FIG. 3 by $w_{12}r_1$).

Figure 6:
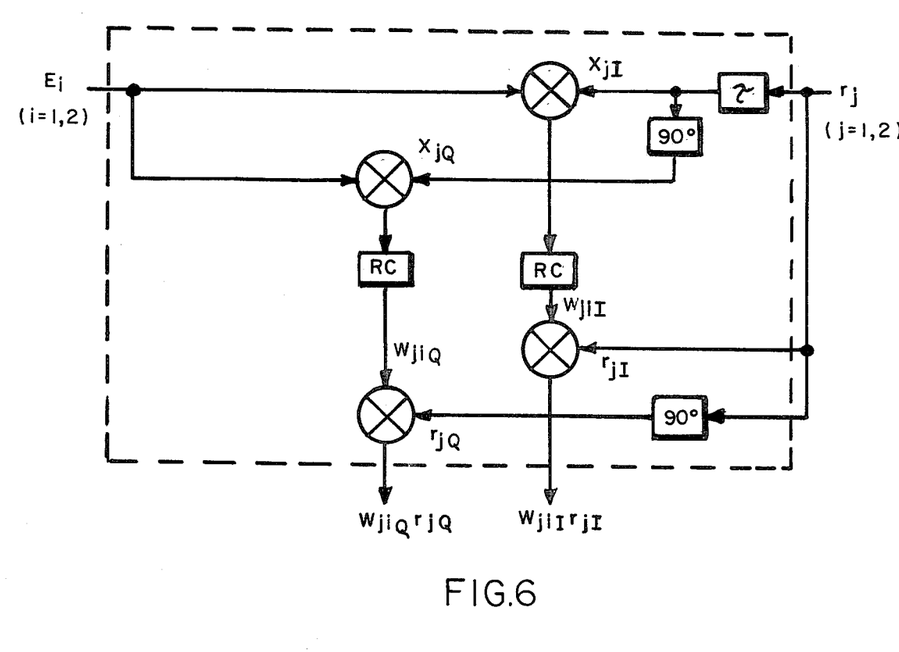
FIG. 6 shows a more detailed block diagram representative of the circuitry for producing the desired weighting functions for complex signals.

While the configuration depicted in FIG. 4 discloses in basic block diagram form an implementation of the re-polarizer of applicant's system, it is recognized that the signals involved are all complex signals which include both in-phase and quadrature components. Accordingly the weighting process thereof, as disclosed in FIG. 4, must include both components in generating the appropriate complex weighted signals. FIG. 6 depicts an exemplary general configuration for the generation of both in-phase and quadrature weighting components depicted as weighting function signal components $W_{jiI}$ (the in-phase component of the weighting function) and $W_{jiQ}$ (the quadrature component of the weighting function).

The use of the above-described decision-directed, adaptive equalizer technique for the re-polarization of the input signals leads to lower costs, both in engineering design and in production, as compared to prior art systems, because no time division multiplexed reference signal is required to be carried in the transmitted data along with the information signal. However, the use of such a decision-directed approach requires some provision for preventing operation of the re-polarization in two stable, but undesired, modes which may arise because of signal fading conditions which could result in an effective breakdown of the decision-directed implementation. Such instances, although rare, must be taken into account in the actual use of a decision-directed system.

One such undesirable operating mode involves a reversal of the data output signals such that in an orthogonally polarized communication system, for example, the vertically polarized data is supplied at the horizontal channel output, while the horizontally polarized data is supplied at the vertical channel output. Such a data reversal condition can result from a fading of signals in all possible polarization paths, i.e. in the direct polarized path, as well as in the cross-polarized paths. If such fading is then followed by an increase in the signal strength of the cross-polarization signals at the expense of the signal strength of the direct signals, as the fading condition ends the system will tend to treat the cross-polarized signals as the desired signals and adapt its equalization thereto so that an interchange of the vertical and horizontal signals occurs at the outputs of the data channels of the receiver.

Another undesired operating mode of re-polarizer may occur in a manner such as to provide the same data at the outputs of both data channels at the receiver. Such a condition, for example, can be caused by an extreme fading of the signal of one polarization (e.g. a fading of vertical signal) which results in a fading of both the direct vertical signal in the vertical channel and the cross-polarized vertical signal in the horizontal channel, whih fading may be coupled with a significant increase in the cross-polarized horizontal signal in the vertical channel. Under such a faded condition, the decision-directed mechanism of the re-polarizer will be unable to operate correctly and the weights generated in the faded channel will tend to have random values. Upon the return of more normal conditions, where the signal strength in the previously-faded vertical channel increases once again, the re-polarizer may then adapt to an undesired mode wherein the cross-polarized signal from the previously non-faded horizontal channel is treated as the desired signal in the vertical channel. In such case, the data channel outputs of the receiver may both contain the same data, i.e. the same horizontal data or the same vertical data depending on which of the two channels initially fades while the other remains relatively strong.

In either of the conditions discussed above, upon the return of more normal conditions where both signals are relatively strong, while the original fading conditions cannot be prevented, the operation of the re-polarizer in an undesired mode for an extensive period of time must be prevented in order to prevent the failure of the overall system which results.

In the case of a simultaneous fading of both channels, elimination of lock-up in the undesired mode, where an interchange of signals may result, can be achieved by temporarily clearing the cross-weighting signals, $w_{12}$ and $w_{21}$, that is by temporarily setting both cross-weighting signals to zero, whenever such a simultaneous fade occurs.

In the case of the fading of only a single channel, it is desirable to arrange the implementation of the system so that if the same data is detected at both channel outputs, the weighting signals can also be appropriately cleared (i.e. made zero) until the faded polarization channel returns to its useful amplitude level and the re-polarizer thereupon returns to its operative condition and correct adaptation can again occur. A circuitry for detecting such conditions and for making appropriate cross-weighting clearances is shown in FIG. 7.

Figure 7:
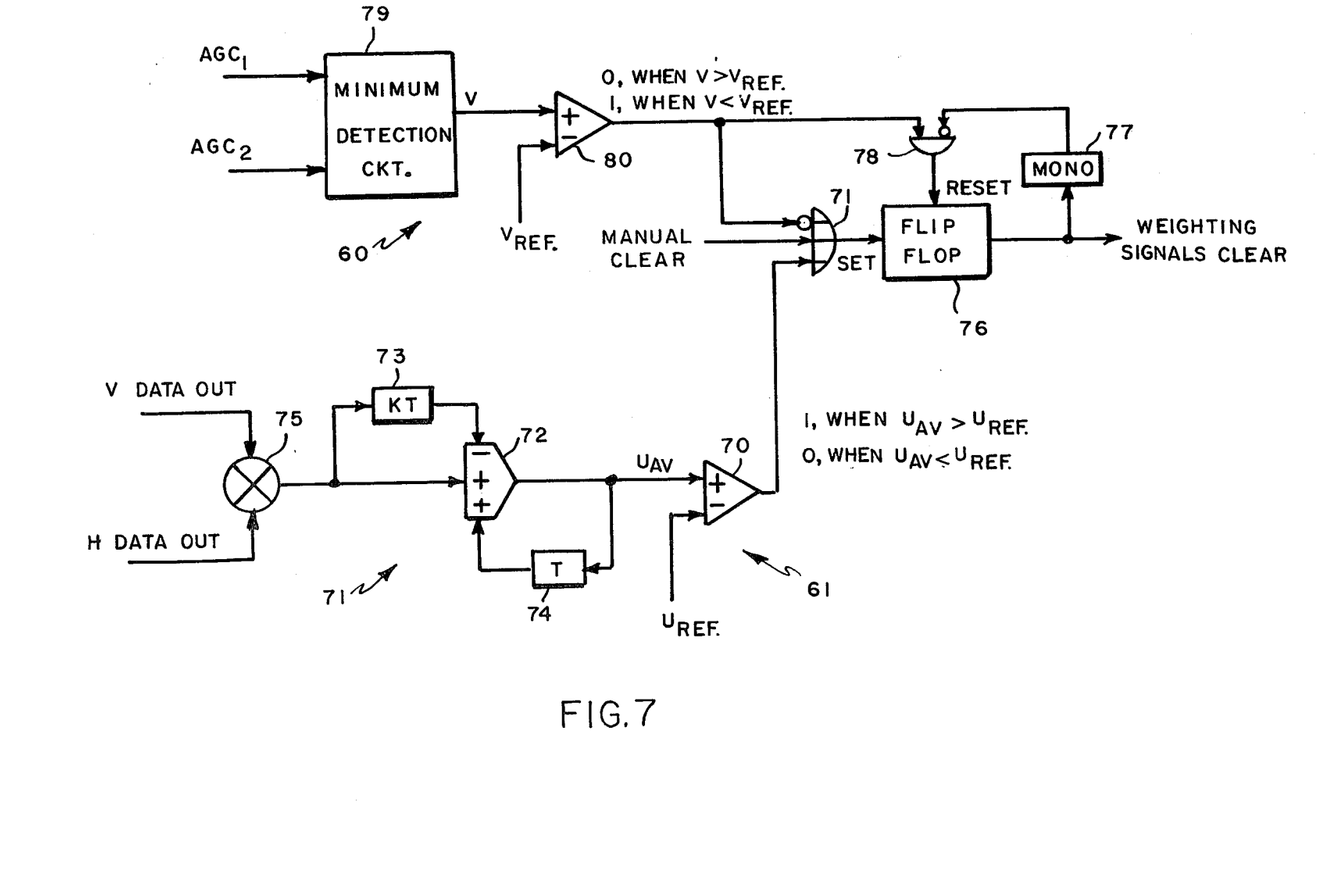
FIG. 7 shows a block diagram of means for preventing operation of the system of the invention in certain undesired failure modes under certain signal fading conditions.

As seen in FIG. 7, the upper portion 60 of the circuitry therein is designed to provide the appropriate "clearing" of the weighting signals when both the vertical and the horizontal data channel signals fade simultaneously and it is desired to avoid the possibility of data output reversal, as disclosed above, while the lower poriton 61 of the circuitry therein is designed to provide the appropriate clearing of the weighting signals when the same data output is present in both the vertical and horizontal channel, i.e. the data signals $d_1$ and $d_2$ of FIG. 4 are the same and represent either the vertical data only or the horizontal data only.

In the latter case, for example, the amplitude difference between the vertical data and the horizontal data is averaged over a selected time period T, e.g. a time period which includes "K" data symbols. If the vertical and horizontal data differs, the averaged difference, represented by the signal $U_{AV}$, tends to be small (ideally zero) and no output is produced at comparator 70. The averaging circuit comprises a summation circuit 72 having a first input effectively representing the difference signal at the output of multiplier 75, a second input requesting such difference delayed by KT and a feedback signal $U_{AV} \times T$ as shown.

Thus, if the vertical and horizontal digital data signals are the same (one or the other is present in both channels), the output of multiplier 75 will continue to supply "1's" over the selected time period so that $U_{AV}$ will become sufficiently large ($U_{AV} > U_{REF}$) so as to produce a "1" at the output of comparator 70. So long as the vertical and horizontal data signals are different $U_{AV}$ will remain sufficiently small ($U_{AV} < U_{REF}$) so as to produce a "0" at comparator 70.

A "1" at comparator 70, indicating failure, is supplied to OR gate 71 to produce a signal for setting flip-flop circuit 76 so that the output thereof, when set, supplies a signal for clearing all of the weighting signals $w_{11}$, $w_{12}$, $w_{22}$ and $w_{21}$, i.e. such weighting signals are effectively set to zero, so long as flip-flop 76 remains set. The output thereof also activates a mono-pulse signal generating circuit 77 which initially provides a "1" pulse which, after a specified time period, goes to "0" at which point a "reset" pulse for flip-flop 76 is produced via AND gate 78 so long as the input vertical and horizontal data signals are then sufficiently large (as discussed in more detail below) and so long as the output from comparator 70 does not indicate that the weighting signals must remain cleared.

For the case where the vertical and horizontal data channels fade simultaneously, the intermediate frequency AGC (automatic gain control) signals associated with each channel, identified as $AGC_1$ and $AGC_2$ signals in FIG. 7, are supplied as input to minimum detection circuitry 79. The AGC signals are obtained from conventional AGC circuitry formed in the receiver (not shown) and in effect represent the average received power in each channel. Circuitry 79 selects the smallest of the two AGC signals, which signal represents the maximum average received power in the channels. Such minimum AGC signal is supplied as signal $v$ to a comparator circuit 80 for comparison with a reference signal $v_{REF}$. When such signal is less than $v_{REF}$, indicating that simultaneous fade has not occurred, the comparator 80 produces a logic "1" and the weighting signals remain as is. When signal $v$ is more than $v_{REF}$, indicating that simultaneous fade has occurred, the comparator 80 produces a logic "0". The presence of a "0" comparator 80 produces a set pulse for flip-flop 76 via OR gate 71 to produce a signal from flip-flop 76 for clearing all of the weighting signals, as described above. A reset pulse is supplied to flip-flop 76 when one or both of the vertical and horizontal signals from the receiver channels again have sufficient amplitudes (i.e. the simultaneous fade condition no longer exists) and the signal $v$ from minimum detection circuit 79 is less than $v_{REF}$ so that no set signal is produced at OR gate 71.

The circuitry of FIG. 7 is further arranged so that the weighting signals can be cleared manually by providing an appropriate "manual clear" signal at an input of flip-flop 76.

Thus, the system of the invention is protected against both failure conditions, one due to a simultaneous fading of both the vertical and horizontal signals wherein the system can lock onto a mode in which data reversal occurs, and the other due to a fading of one of the horizontal or vertical signals wherein the system can lock onto a mode in which the data channels both produce the same vertical signal or the same horizontal signal.

What is claimed is:

1. A dual channel receiver system for processing first and second digital data signals having, when transmitted, first and second polarizations, respectively, said receiver comprising:

first and second receiver channels for receiving said first and second digital data signals, respectively, said first signal having, when received, a principal signal component corresponding to said first polarization and at least one error signal component corresponding to said second polarization and said second signal having a principal signal component corresponding to said second polarization and at least one error signal component corresponding to said first polarization;

first and second adaptive filter equalization means in said first and second receiver channels, respectively, responsive to said received first and second signals and to error control signals for providing a plurality of weighting signals and for selectively combining said weighting signals with said first and second signals to produce receiver output signals in each of said receiver channels having reduced error signal components; and first and second error signal generating means responsive to the receiver output signals and to desired data out signals in said first and second receiver channels, respectively, for providing said error control signals to control the weighting signals in said adaptive filter equalization means.

2. A dual channel receiver system in accordance with claim 1 and further including means for clearing said weighting signals to zero when said received first and second signals fade simultaneously to levels below a preselected reference level.

3. A dual channel receiver system in accordance with claim 1 and further including means for clearing said weighting signals to zero when the receiver output signals in both channels are substantially identical.

4. A dual channel receiver system in accordance with claim 1 wherein said first and second adaptive filter equalization means are connected in said first and second receiver channels so as to be responsive to said received first and second signals when said signals are both intermediate frequency signals.

5. A dual channel receiver system in accordance with claim 4 wherein the adaptive filter equalization means in each said channel includes:

time delay means responsive to the input signal to said channel to produce a time delayed input signal;

phase shift means responsive to the input signal to said channel to produce a phase shifted input signal;

means for combining the time delayed input signal in said channel with the error control signal associated with said channel to produce a first weighting signal;

means for weighting the input signal to said channel by said first weighting signal to produce a first weighted signal;

means for combining the time delayed input signal from the other channel with said above-named error control signal to produce a second weighting signal;

means for weighting the phase shifted input signal from the other channel by said second weighting signal to produce a second weighted signal; and means for combining said first weighted signal and said second weighted signal to produce the receiver output signal from said channel.

6. A dual channel receiver system in accordance with claim 5 wherein said first and second signals, when transmitted, are orthogonally polarized and said phase shifted signal is shifted in phase by 90°.

7. A dual channel receiver system in accordance with claim 6 wherein said orthogonally polarized signals are left-circular polarized and right-circular polarized, respectively.

8. A dual channel receiver system in accordance with claim 6 wherein said orthogonally polarized signals are vertically and horizontally polarized, respectively.

9. A dual channel receiver system in accordance with claim 5 and further including
    means for generating said desired data out signals in said first and second receiver channels; and further wherein said first and said second error signal generating means in each said channel includes:
    means for comparing the receiver output signal in each said channel with a plurality of reference signals to produce a plurality of comparison signals; and
    means for combining said plurality of comparison signals and said desired data out signal in said channel to produce the error control signal for each said channel.

10. A dual channel receiver system in accordance with claim 9 and further including means for clearing said weighting signals to zero when said received first and second signals fade simultaneously to levels below a preselected reference level.

11. A dual channel receiver system in accordance with claim 10 wherein said clearing means includes:
    means for providing a detected signal representing the maximum average received signal power which is present in one of said first and second receiver channels;
    means for comparing said detected signals with a reference signal for providing a control signal for clearing said weighting signals to zero when said detected signal is more than said reference signal.

12. A dual channel receiver in accordance with claim 9 and further including means for clearing said weighting signals to zero when the receiver output signals in each of said first and second receiver channels are substantially identical.

13. A dual channel receiver in accordance with claim 12 wherein said clearing means includes:
    means providing a difference signal representing the average difference between the amplitudes of the receiver output signals from said first and second receiver channels over a selected time period; and
    means for comparing said difference signal with a reference signal for providing a control signal for clearing said weighting signals to zero when said difference signal is less than said reference signal.

* * * * *